United States Patent

[11] 3,575,062

[72] Inventors Ernest W. Kitzner
Allen Park;
Alex Rhodes, Detroit, Mich.
[21] Appl. No. 1,474
[22] Filed Jan. 8, 1970
[45] Patented Apr. 13, 1971
[73] Assignee Ford Motor Company
Dearborn, Mich.

[54] TRANSMISSION SHIFT CONTROL LINKAGE
8 Claims, 4 Drawing Figs.
[52] U.S. Cl................................................. 74/484,
74/473SW
[51] Int. Cl........................................................ G05g 9/16
[50] Field of Search............................................74/484, 473
(SW), 473, 475, 476, 477

[56] References Cited
UNITED STATES PATENTS
2,231,740  2/1941  Wharam...................... 74/484
2,875,637  3/1959  Gurney et al. ................ 74/484

*Primary Examiner*—Milton Kaufman
*Attorneys*—John R. Faulkner and Donald J. Harrington ABSTRACT: A gearshift linkage mechanism for use with a so-called mini-steering column in an automotive vehicle comprising a shift tube which is mounted concentrically with respect to a steering column of abbreviated length, a gearshift selector shaft mounted in spaced, parallel disposition with respect to the steering column and an articulated connection between the shift tube and the selector shaft for translating motion of one to the other during transmission ratio changes.

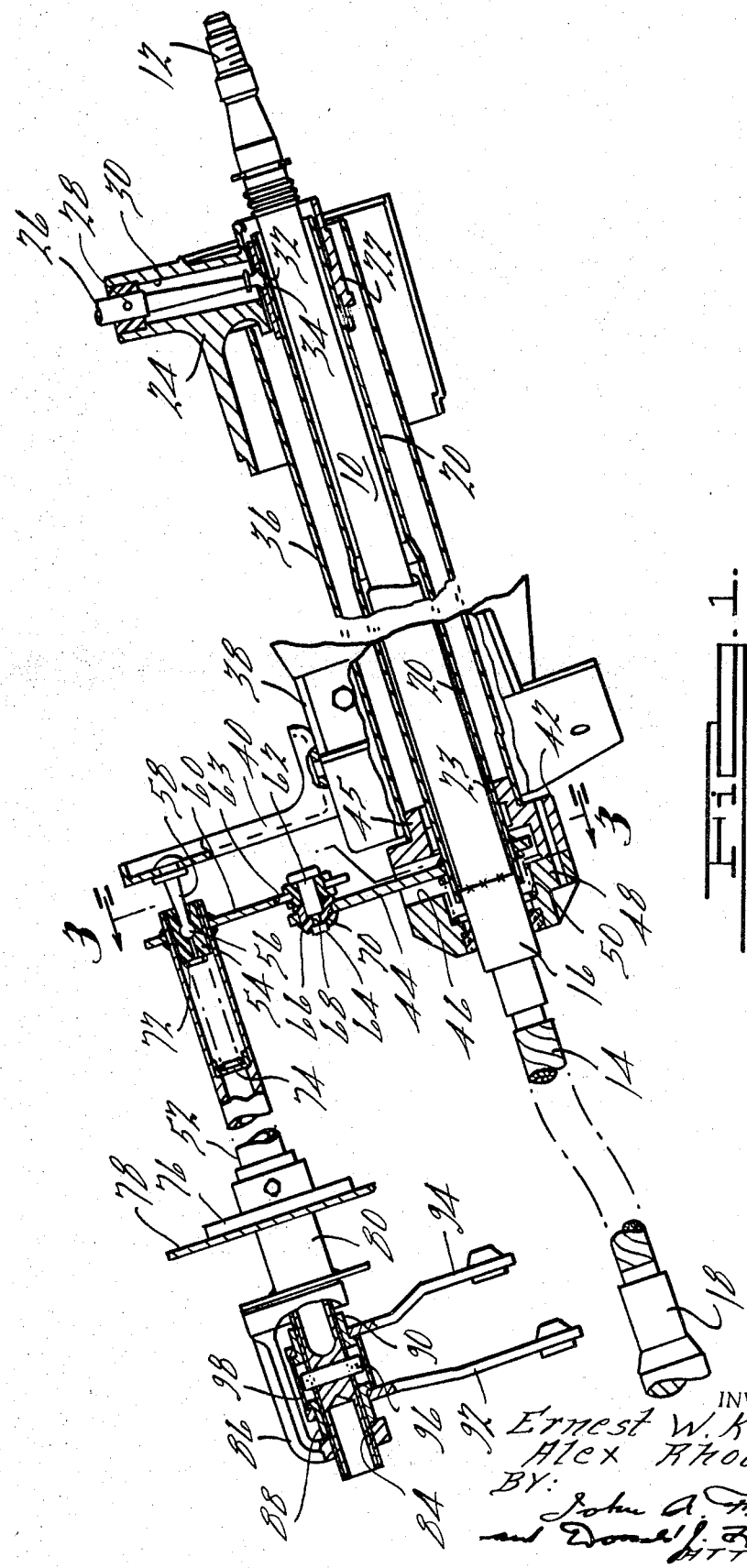

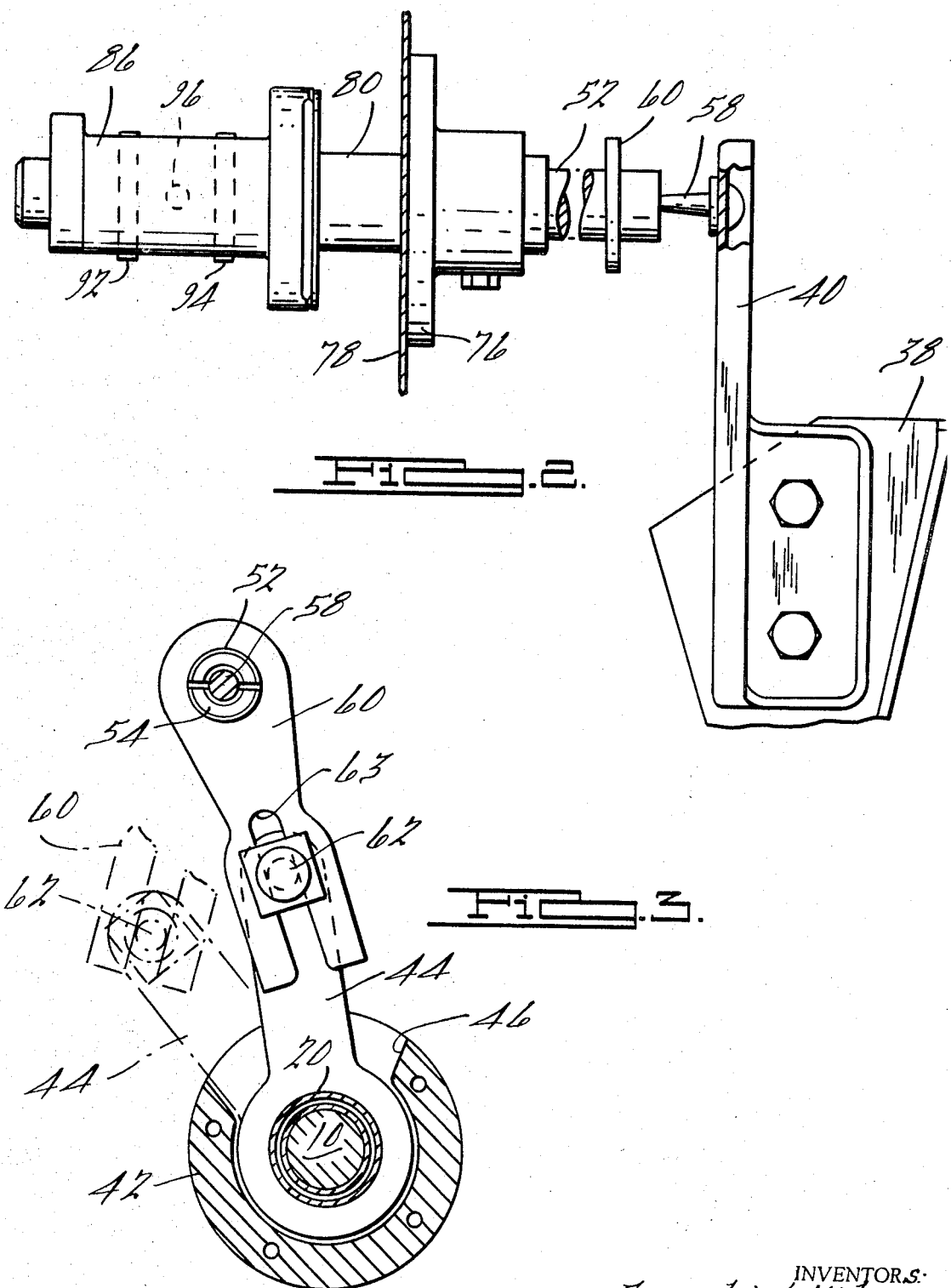

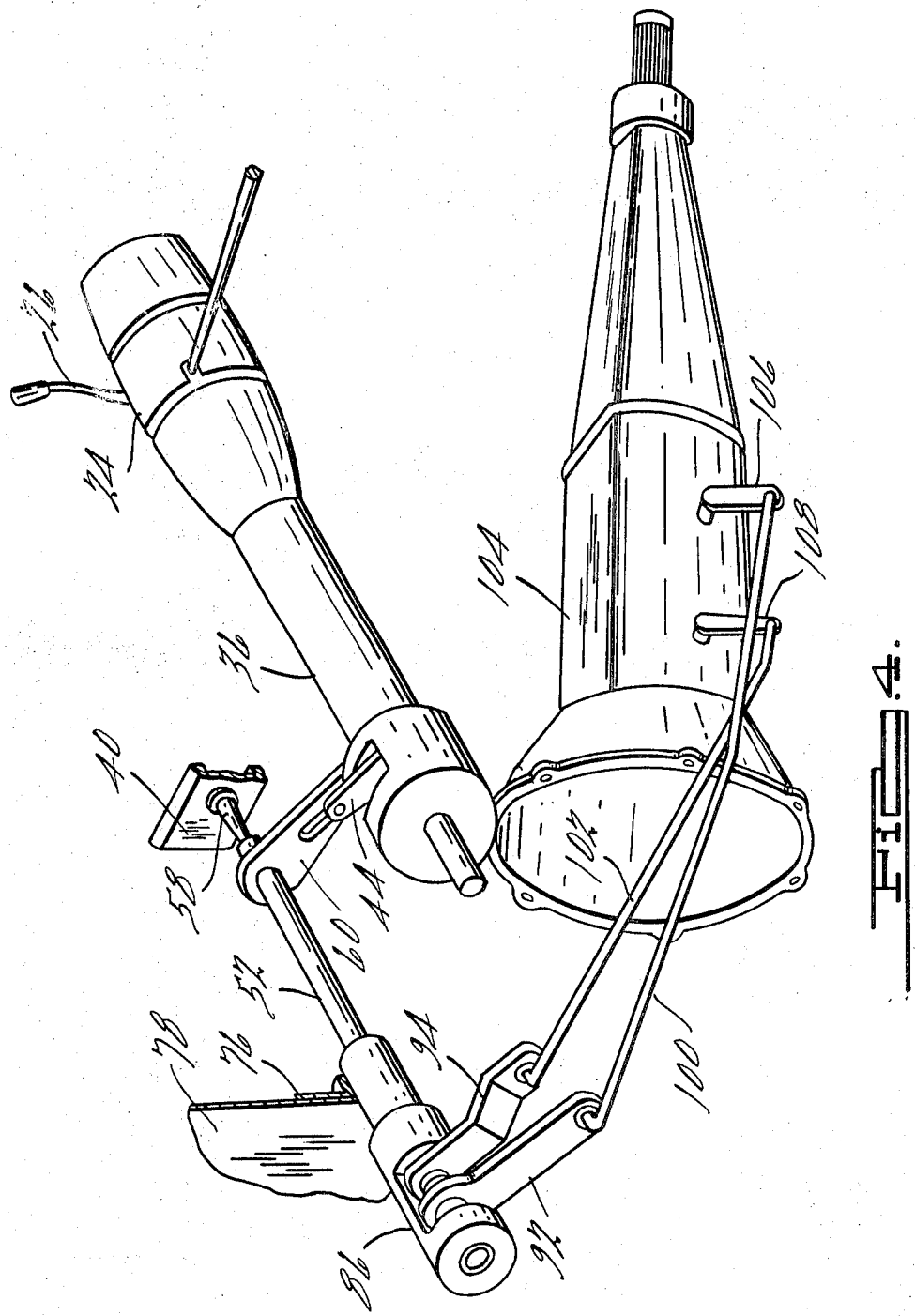

TRANSMISSION SHIFT CONTROL LINKAGE

GENERAL DESCRIPTION OF THE INVENTION

My invention is adapted to be used in an automotive vehicle for controlling ratio changes in a multiple-ratio power transmission mechanism adapted to deliver torque from the engine to the vehicle traction wheels. The invention includes a shift column which is mounted for movement about an axis that is displaced in parallel disposition with respect to the axis of the steering column. The steering column is mounted on the forward chassis or body structures of the vehicle passenger compartment. Because of its abbreviated length it does not extend through the vehicle engine compartment, as is the case with most conventional steering wheel columns. Because of the disposition of the gearshift linkage elements and the column structure, interference between these elements and the vehicle components within the engine compartment is avoided. Greater flexibility in design thus is made possible.

An articulated connection is used for transferring shifting movement of a gearshift selector tube to a gearshift linkage, the former being mounted for rotation about the axis of the steering column. The location of the gearshift linkage and the steering column may be varied depending upon the packaging requirements of the components within the vehicle engine compartment. This can be achieved without interference with the shift geometry.

The gearshift elements are semi-isolated from the steering column elements, and for this reason the two structures can be assembled independently. This reduces labor cost in both assembly and repair. Furthermore, if the mini-steering column design is subjected to an impact load, it is possible for the structural elements of the steering column to break away from the structural elements of the gearshift linkage mechanism, thereby making it possible for the steering column to absorb the energy of the impact load over a greater displacement than that otherwise would be possible.

When my invention is adapted for use with a manual transmission mechanism, it is necessary to impart to the gearshift selector shaft both a rotary motion and an axial motion. A positive clutch arrangement at the lower end of the selector shaft makes it possible to select either one shift lever or another depending upon which ratio shift is desired.

BRIEF DESCRIPTION OF THE FIGURES OF THE DRAWING

FIG. 1 shows in longitudinal cross-sectional form my improved shift linkage mechanism, together with the base portion of a mini-steering column in an automotive vehicle;

FIG. 2 is a plan view partly in section of the structure of FIG. 1;

FIG. 3 is a cross-sectional view as seen from the plane of section line 3–3 of FIG. 1;

FIG. 4 is a schematic three-dimensional drawing of the mini-column of the gearshift linkage assembly of my invention.

PARTICULAR DESCRIPTION OF THE INVENTION

In FIG. 1, numeral 10 represents a steering column for an automotive vehicle. At its upper end 12 there are formed external splines to permit a driving connection with the hub of the steering wheel. The lower end of the column 10 is secured to a flexible torque transmitting cable 14. Shaft 10 is connected to the end of the cable by a suitable collar 16 within which the end of the cable 14 is secured. The lower end of the cable 14 is connected by means of a suitable connector 18 to driven portions of the steering system. A shift tube 20 surrounds the steering shaft 10. It is received within a supporting collar 22 at the upper end of the steering column. This in turn is slidably supported by an upper support 24 for a steering column assembly. Support 24 is held relatively stationary with respect to the gear shift linkage and the steering shaft.

A gearshift lever 26 is pinned to the support 24 for oscillation about axis 28. Lever 26 extends radially inwardly through opening 30 and is received within an opening 32 in a collar 22. The inner end of the lever 26 is formed with a spherical bearing portion 34 adapted to register with the sides of the opening 32. When the lever 26 is oscillated about the axis 28, collar 22 is shifted in the direction of the axis of the shaft 10. If the gearshift lever 26 is rotated about the axis of the shaft 10, it also moves collar 22 in unison with it. Collar 22, since it is secured to the shift tube 20, will cause the shift tube 20 to rotate about the axis of the shaft 10 as the gearshift lever 26 is rotated in a plane transverse to the axis of the shaft 10. It will be shifted in an axial direction if the gearshift lever 26 is oscillated about the axis 28. Support 24 in turn is supported by a relatively stationary tube 36 which is secured to the vehicle dash structure.

The connection between the stationary tube 36 and the dash structure includes a bracket 38 adjacent the vehicle dash. A secondary bracket 40 in turn supports the bracket 38. A shaft support of generally circular form is fixed in the lower end of the tube 36, as shown at 42. It includes an extension 45, which is telescopically received within the end of the tube 36. The shift tube 20 is journaled in opening 23 formed in the support 42. A lever 44 extends radially outwardly from the support 42 and is secured at its radially inward end to the tube 20. Lever 44 extends through a radial opening 46, which is of sufficient width to permit axial movement of the tube 20 and the lever 44 with respect to the steering shaft. Support 42 can be formed in two parts, the lower part shown at 48 being bolted to the upper part. Part 48 retains a compression spring 50 which acts on the lever 44 and tends to urge the shift tube 20 in an upward direction toward the vehicle operator.

A gearshift shaft 52 is mounted in generally parallel spaced relationship with respect to the axis of the shaft 10. It is end-supported at one end by a bearing 54 slidably positioned within the shaft 52, which is preferably tubular in form. Bearing 54 can be split or bipartite and it defines a spherical bearing surface that receives the bearing portion 56 of support 58. This in turn is secured at one end to the bracket 40. A sliding action of the bearing 54 will accommodate slight misalignment that might be experienced during assembly. It permits also rotary motion of the shaft 52 about its axis without causing binding due to misalignment of the axis of the shaft 52 with respect to the axis of the shaft 10.

Shaft 52 is secured to the radially inward end of lever 60. The radially outward end of lever 60 is arranged in adjacent, juxtaposed relationship with respect to the outer end of the lever 44. Lever 60 is slotted at 62 to permit a sliding bearing connection with a bearing guide 62. Guide 62 is provided with a pin 64 which is received within an insulator 66. The pin 64 and the insulator 66 are formed with an interlocking ridge and groove as shown at 68. The insulator 66 is pressed within opening 70 formed in the end of the lever 44.

As the lever 44 is rotated about the axis of the shaft 10, the bearing guide 62 slides within the slot 63 in a partially rotary motion to the lever 60. Upon actual shifting movement of the tube 20, the connection provided by the guide 62 will cause axial-shifting movement of the lever 60 as well as the shaft 52. The translation of axial motion from the tube 20 to the shaft 52 can take place in either direction.

Shaft 52 normally is urged in a downward direction by compression spring 72 situated within the shaft 52. Spring 72 is seated on the bearing 54 at one end and is seated upon a spring seat 74 at its other end. Seat 74 in turn reacts against a shoulder formed within the shaft 52.

The lower end of the shaft 52 is supported by a bracket 76, which in turn is bolted to a forward fire wall 78 of the vehicle body. Shaft 52 is slidably positioned within a bearing sleeve 80 supported by the bracket 76. It is slidably received also within an opening 82 formed in an extension 86 of the sleeve 80. A pair of clutch elements 88 and 90 is supported by the shaft 52 within the extension 86. A low-and-reverse shift lever 92 is secured at its radially inward end to the clutch element 88 and an intermediate and high shift lever 94 is secured at its radially inward end to the clutch element 90. An actuator pin 96 is carried by the shaft 52 and is adapted to be moved in an axial direction with the shaft 52. When it is moved in a right hand or upper direction, clutching engagement occurs between the pin 96 and the clutch element 90. When it is moved in the other direction, clutching engagement occurs between the pin 96 and the clutch element 88. A collar 98 surrounds the pin 96 and the clutch elements 80 and 90.

When the shaft 52 is shifted in a right hand or upward direction, pin 96 engages clutch element 90 thereby causing lever 94 to follow the motion of the shaft 52. If the shaft 52 is shifted in the opposite direction, it becomes connected through the pin 96 and the clutch element 88 with the lever 92.

In the schematic representation of FIG. 4, the motion transmitting linkage for the levers 92 and 94 is illustrated. These include rods 100 and 102 which extend downwardly to one side of transmission 104. The low-and-reverse lever for the transmission is shown at 106 and the intermediate-and-high lever is shown at 108. These are connected respectively to the lower ends of rods 102 and 100.

Having thus described a preferred embodiment of my invention, what I claim and desire to secure by U.S. Letters Patent is:

We claim:

1. In a vehicle-steering column and gearshift lever assembly including a steering shaft, a shift tube surrounding said steering shaft, means for mounting said steering shaft, and said shift tube within a vehicle passenger compartment, a gearshift-controlling shaft arranged in spaced relationship in generally parallel disposition with respect to said steering column, an actuating lever secured to one end of said shift tube, a companion shift lever secured to said shift-controlling shaft, means for establishing a rotary motion transmitting connection between the radially outward ends of said levers, transmission gearshift linkage elements including lever elements mounted for rotation about the axis of said shift-controlling shaft, and means for connecting said shift-controlling shaft to said lever elements to effect rotary motion thereof upon rotation of said shift tube.

2. The combination set forth in claim 1 wherein the motion transmitting connection between said actuating lever and said control lever for said shift-controlling shaft includes a pin-and-slot connection with a slot formed in one lever and a registering pin carried by the outer lever whereby rotation of one lever in one direction imparts rotary adjustment of the other lever in the opposite direction as said pin moves through said slot.

3. The combination set forth in claim 2 wherein the pin-and-slot connection between said actuating lever and lever connected to said shift-controlling shaft includes a releasable insulator connected to said pin and detached therefrom upon an impact load thereby permitting separation of said levers as said steering column is forced out of its normal operating position with respect to said shift-controlling shaft.

4. The combination set forth in claim 1 including bearing means for said shift-controlling shaft adapted to accommodate misalignment in the shift-controlling shaft resulting in deviations from its parallel disposition with respect to the steering column whereby binding of said shift-controlling shaft upon rotary adjustment thereof is avoided.

5. In a steering column assembly and gearshift linkage mechanism for an automotive vehicle including a steering shaft, a shift tube surrounding said steering shaft and mounted with one end thereof in the vehicle passenger compartment, an operating lever secured to the other end of said shift tube, a gear shift shaft mounted in generally parallel spaced disposition with respect to said steering shaft, a shift lever carried by said shift-controlling shaft, a rotary motion transmitting connection between said shift lever and said operating lever, bearing means supporting said shift-controlling shaft at axially spaced locations for limited axial movement, said shift-controlling shaft following axial motion of said shift tube upon movement thereof by the vehicle operator in an axial direction and following rotary adjustment of said shift tube upon rotation thereof by the vehicle operator, a pair of gearshift levers mounted adjacent one end of said shift-controlling shaft, and clutch means for selectively connecting said shift-controlling levers to said shift-controlling shaft, one shift lever being clutched by said clutch means to said shift-controlling shaft upon adjustment of said shift tube in one direction and the other shift lever being clutched to said shift-controlling shaft upon adjustment of said shift tube in the other direction.

6. The combination set forth in claim 5 wherein the motion transmitting connection between said actuating lever and said control lever for said shift-controlling shaft includes a pin-and-slot connection with a slot formed in one lever and a registering pin carried by the outer lever whereby rotation of one lever in one direction imparts rotary adjustment of the other lever in the opposite direction as said pin moves through said slot.

7. The combination set forth in claim 6 wherein the pin-and-slot connection between said actuating lever and lever connected to said shift-controlling shaft includes a releasable insulator connected to said pin and detached therefrom upon an impact load thereby permitting separation of said levers as said steering column is forced out of its normal operating position with respect to said shift-controlling shaft.

8. The combination set forth in claim 5 wherein the bearing means for said shift-controlling shaft including means adapted to accommodate misalignment in the shift-controlling shaft resulting in deviations from its parallel disposition with respect to the steering column whereby binding of said shift-controlling shaft upon rotary adjustment thereof is avoided.

UNITED STATES PATENT OFFICE
CERTIFICATE OF CORRECTION

Patent No. 3,575,062   Dated April 13, 1971

Inventor(s) Ernest W. Kitzner

It is certified that error appears in the above-identified patent and that said Letters Patent are hereby corrected as shown below:

Column 3, line 45, cancel "control" and substitute --shift--; line 47, cancel "outer" and substitute --other--

Column 4, line 14, cancel "operating" and substitute --actuating--; line 15, after "shift" insert -- -controllin (with a hyphen), line 27, cancel "shift-controlling" and substitute --gearshift--; line 28, cancel "shift" and substitute --gearshift--; line 30, cancel "shift", second occurrence, and insert -- gearshift -- .

Column 4, line 35, cancel "control" and substitute --shift--; line 37, cancel "outer" and substitute --other--

Column 4, line 42, after "and" insert --the--.

Column 4, line 49, cancel "including means" and substitute --includes means--.

Column 4, line 19, "operating" should read -- actuatin

Signed and sealed this 8th day of May 1973.

(SEAL)
Attest:

EDWARD M. FLETCHER, JR.
Attesting Officer

ROBERT GOTTSCHALK
Commissioner of Patent